United States Patent
Subramani et al.

(10) Patent No.: US 10,271,354 B2
(45) Date of Patent: Apr. 23, 2019

(54) DYNAMIC SENSITIVITY CONTROL IN 802.11 STATIONS

(71) Applicant: KABUSHIKI KAISHA TOSHIBA, Tokyo (JP)

(72) Inventors: Siva Kupanna Subramani, Bristol (GB); Fengming Cao, Bristol (GB); Parag Gopal Kulkarni, Bristol (GB); Mahesh Sooriyabandara, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/506,598

(22) PCT Filed: Mar. 31, 2015

(86) PCT No.: PCT/GB2015/051013
§ 371 (c)(1),
(2) Date: Feb. 24, 2017

(87) PCT Pub. No.: WO2016/156768
PCT Pub. Date: Oct. 6, 2016

(65) Prior Publication Data
US 2018/0014328 A1    Jan. 11, 2018

(51) Int. Cl.
*H04W 74/08* (2009.01)
*H04W 52/36* (2009.01)
*H04W 84/12* (2009.01)
*H04W 88/08* (2009.01)

(52) U.S. Cl.
CPC ..... *H04W 74/0816* (2013.01); *H04W 52/367* (2013.01); *H04W 74/0808* (2013.01); *H04W 84/12* (2013.01); *H04W 88/08* (2013.01)

(58) Field of Classification Search
CPC ........... H04W 74/0816; H04W 52/367; H04W 74/0808
See application file for complete search history.

(56) References Cited

U.S. PATENT DOCUMENTS

| | | | |
|---|---|---|---|
| 6,157,616 A | 12/2000 | Whitehead | |
| 2002/0183020 A1* | 12/2002 | Zhu | H04L 1/0003 455/108 |
| 2008/0125160 A1 | 5/2008 | Zhu | |

(Continued)

FOREIGN PATENT DOCUMENTS

| | | |
|---|---|---|
| JP | 2006-165742 A | 6/2006 |
| JP | 2013-175940 A | 9/2013 |

(Continued)

OTHER PUBLICATIONS

International Preliminary Report on Patentability issued by The International Bureau of WIPO dated Oct. 12, 2017, for International Patent Application No. PCT/GB2015/051013.

*Primary Examiner* — Ronald B Abelson
(74) *Attorney, Agent, or Firm* — Finnegan, Henderson, Farabow, Garrett & Dunner, L.L.P.

(57) ABSTRACT

A device and/or method for dynamically adjusting a CCA threshold in an addressable unit that is suitable for communication in a wireless network, the method performed in the addressable unit and comprising autonomously increasing the CCA threshold with successful data transmissions and/or autonomously decreasing the CCA threshold with unsuccessful data transmissions.

12 Claims, 4 Drawing Sheets

(56) References Cited

U.S. PATENT DOCUMENTS

2013/0017794 A1    1/2013  Kloper et al.
2015/0032868 A1*   1/2015  Sung .................... H04L 1/0021
                                                               709/221

FOREIGN PATENT DOCUMENTS

| JP | 2015-534418 A | 11/2015 |
| JP | 2016-517658 A | 6/2016 |
| WO | WO 2007/027442 A2 | 3/2007 |
| WO | WO 2014-071308 A1 | 5/2014 |
| WO | WO 2014-158784 A1 | 10/2014 |
| WO | WO 2015/038930 A1 | 3/2015 |

\* cited by examiner

DYNAMIC SENSITIVITY CONTROL IN 802.11 STATIONS

FIELD

Embodiments described herein relate generally to wireless communication methods and devices and more specifically to methods and devices for managing the clear channel assessment (CCA) thresholds for wireless stations.

BACKGROUND

Wireless Local Area Network (WLAN) technology has significantly matured over the last decade and while it continues to function well, there are scenarios where it struggles to deliver acceptable performance for the most basic services. In particular, in scenarios with highly dense deployments, performance can deteriorate. One of the main causes of this deterioration is the overcrowding of devices in the unlicensed bands where WLANs typically operate.

Generally, wireless networks comprise a wireless access point which allows wireless stations to wirelessly connect to a wired network. A wireless station is a device which has the capability to connect wirelessly to a wireless network, for instance, via the 802.11 wireless protocol.

The performance of a wireless station can vary depending on its distance from the access point. Accordingly, in some scenarios, stations in a good position, say, for example, physically close to the access point, can dominate communication with the access point to the detriment of stations at the edge of the network. This can not only lead to unfairness between network users but also to an overall drop in throughput across the network. Accordingly, there is a need for a method for managing the access point and/or stations to improve fairness and throughout across the network.

BRIEF DESCRIPTION OF THE DRAWINGS

The present invention will be understood and appreciated more fully from the following detailed description taken in conjunction with drawings in which.

DETAILED DESCRIPTION

The fundamental access method of the IEEE 802.11 MAC is carrier sense multiple access with collision avoidance (CSMA/CA). The protocol uses carrier sensing to determine if the shared medium is available before transmitting to avoid packet collision. Two types of carrier sensing are, at the date of writing, supported by the IEEE802.11 standard (i) mandatory: physical carrier sensing (PCS), and (ii) optional: virtual carrier sensing (VCS) that uses request-to-send/clear-to-send (RTS/CTS) handshake method.

The VCS method was designed to avoid hidden-terminal problem, however this incurs additional overhead and is not preferred in small packets scenarios. Physical carrier sensing is the preferred method and widely implemented. In physical carrier sensing, the station samples energy level in the medium (for a period of 4 μs) and starts transmission only if the reading is below the carrier sensing threshold. This method of carrier sensing is referred to as Clear Channel Assessment (CCA) and the threshold as "CCA level". This CCA level dictates the receiver sensitivity of the station. For convenience, we interchangeably use the term receiver sensitivity and CCA level, although this is not to be understood as referring to the physical receiver sensitivity. Instead the term receiver sensitivity in this context is to be understood as referring to the sensitivity the receiver chooses to adopt through the choice of CCA level.

Figure 1:
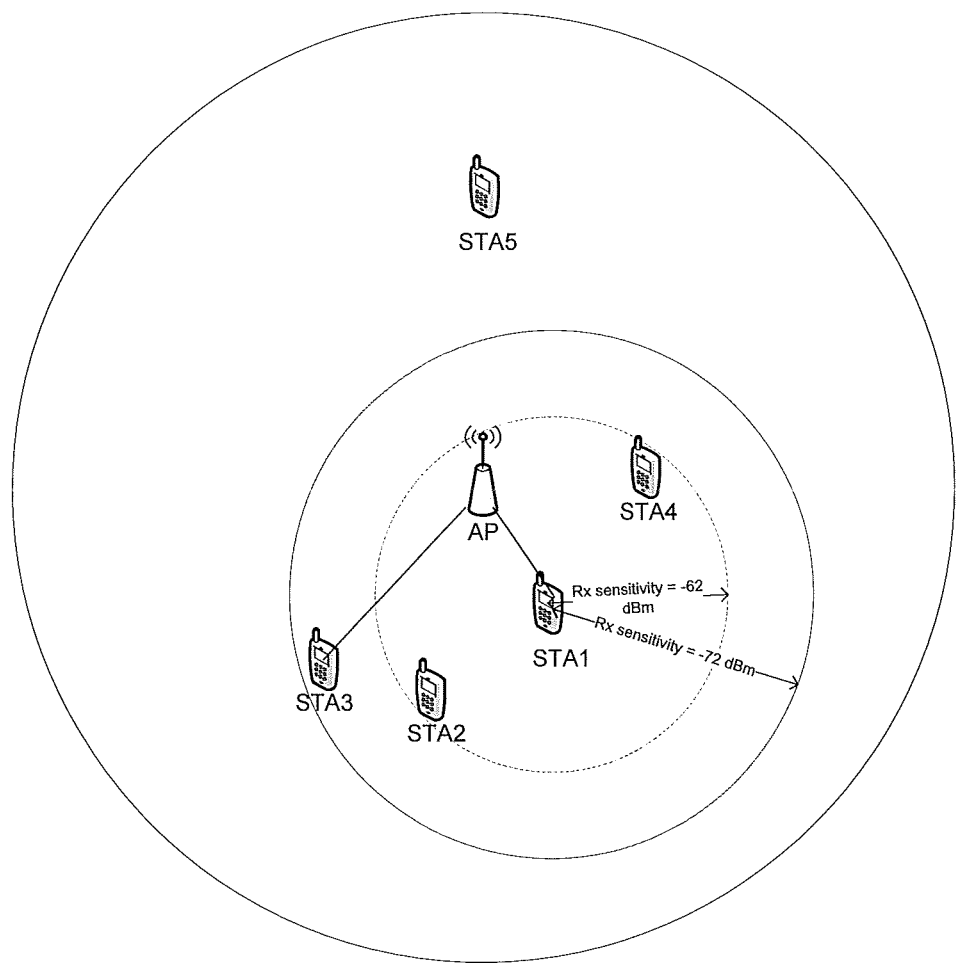
FIG. 1 shows the effect CCA threshold adjustment of a station has in a network.

The effect of PCS is illustrated in FIG. 1, which illustrates a wireless network comprising an access point. Five wireless stations are located in the transmission range of the access point. A station, prior to transmitting on a transmission channel tries to evaluate if data transmission is already taking place on the channel. To allow the station to do so, it defines a threshold, referred to herein as clear channel assessment (CCA) threshold. If signals above this threshold are received by the station then it concludes that data transmission involving other stations is already under way and refrains from transmitting signals itself. The station concludes that the channel is free to accommodate its own attempts at data transmission only if any signals that are received are weaker/below the set threshold.

Invariably, signals emanating from a station decrease in strength with distance from the emitting station. Consequently, data or signals transmitted by a station at a large distance from a station trying to determine whether or not the channel it intends to be used for data transmission is clear are more likely to fall below a given CCA threshold than signals transmitted by a station closer to the investigating station. This is illustrated in FIG. 1 using the example of station 1 (STA1). If the CCA threshold of STA1 is set to −72 dBm, then only signals transmitted by the fifth station (STA5) are not recognised as valid data traffic and ignored by STA1 when determining whether or not a channel is free for use. STA5 is referred to as a hidden terminal in this context, as STA 1 does not recognise signals transmitted by STA5 as validly transmitted data signals, although data collision or, more generally, interference can still occur between signals transmitted by STA1 and STA5.

Signals transmitted by station 3 are recognised as signals occupying the transmission channel, although these signals will be so weak as to be close to the threshold (making STA3 an 'edge station'). If the CCA threshold of STA1 is increased to −62 dBm, then signals emitted by station 3 are no longer recognised by STA1 as valid signals occupying the transmission channel, with STAs 2 and 4 becoming edge cells.

In generic terms, the 802.11 standard refers to all the addressable units as "stations" (STA). In an infrastructure setup, the centralised unit which has STA functionality but also manages all the distributed stations is referred to as Access Point (AP).

So far, the 802.11 MAC implementations use a static CCA threshold (the values of threshold is also bandwidth dependent, e.g. the values are −82 dBm for 20 MHz, −79 dBm for 40 MHz, −76 dBm for 80 MHz and so on). This fixed physical carrier sensing often leads to STAs being too conservative, i.e. they avoid transmitting their own signals even if the only signals detected on the medium are signals that would not lead to packed clashes or interference. It has been realised that it is better to adapt CCA level depending on the location of the STA w.r.t the AP. However finding an optimal CCA threshold is a challenging problem.

Frames sent over an 802.11 wireless link, if successfully transmitted, would result in an acknowledgment (ACK)

being issued by the receiver. If the frames are corrupted, it may be possible to differentiate the type of impairment and take corresponding action.

The idea underlying the principle of Dynamic Sensitivity Control is to vary the CCA threshold of the STA to minimise overhearing other STAs operating on the same channel in adjacent networks. The details of when to adapt and by how much to adapt the CCA threshold are, however, open issues.

According to one embodiment there is provided a device configured to be capable of dynamically adjusting a CCA threshold in an addressable unit that is suitable for communication in a wireless network. The device comprises a part operative to increase the CCA threshold in view of successful data transmissions and/or decreases the CCA threshold in view of unsuccessful data transmissions.

The device may further be operative to increase transmit power following one or more unsuccessful data transmissions and/or decrease transmit power following one or more successful data transmissions.

The device may further be operative to decrease the CCA threshold following an unsuccessful data transmission only if, following a preceding unsuccessful data transmission, the transmit power had been increased.

The device may further be operative to decrease the CCA threshold if, after the transmit power has been maximised, data transmission is still unsuccessful.

The device may further be operative to increase or decrease said CCA threshold following a predetermined number of respective successful or unsuccessful data transmissions.

The device may further be operative to check, following a determination that a data transmission was unsuccessful, whether the data transmission was unsuccessful as a result of channel impairment and, if the data transmission was unsuccessful as a result of channel impairment, select a modulation and coding scheme that accommodates a less reliable channel than the protocol used for the failed data transmission. The selection may be made from among a predetermined list of available modulation and coding schemes.

An amount by which the CCA value is increased or decreased may be inversely proportional to a number of further addressable units known by the addressable units as being present in the network.

An amount by which the CCA value is increased or decreased may be selected from a list of possible amounts stored in or available to the addressable unit.

According to another embodiment there is provided a method of dynamically adjusting a CCA threshold in an addressable unit that is suitable for communication in a wireless network. The method is performed in the addressable unit and comprises autonomously increasing the CCA threshold with successful data transmissions and/or autonomously decreasing the CCA threshold with unsuccessful data transmissions.

The method may further comprise increasing transmit power following one or more unsuccessful data transmissions and/or decreasing transmit power following one or more successful data transmissions.

The CCA threshold may be decreased following an unsuccessful data transmission only if, following a preceding unsuccessful data transmission, the transmit power had been increased.

The CCA threshold may be decreased if, after the transmit power has been maximised, data transmission is still unsuccessful.

The CCA threshold may be increased or decreased following a predetermined number of respective successful or unsuccessful data transmissions.

The method may further comprise checking, following a determination that a data transmission was unsuccessful, whether the data transmission was unsuccessful as a result of channel impairment and, if the data transmission was unsuccessful as a result of channel impairment, selecting a modulation and coding scheme that accommodates a less reliable channel than the protocol used for the failed data transmission.

An amount by which the CCA value is increased or decreased may be inversely proportional to a number of further addressable units known by the addressable units as being present in the network.

An amount by which the CCA value is increased or decreased may be selected from a list of possible amounts stored in or available to the addressable unit.

Fixed physical carrier sensing can lead to STAs being too conservative, the STAs defer its transmissions even if the other transmissions do not directly conflict (exposed terminal problem). The increase in CCA threshold potentially introduces hidden nodes that would increase in collision of packets, including ACK collision. As illustrated in FIG. 1, STA3 that was heard by STA1 at receiver sensitivity −72 dBm, will not be heard when STA3 switches to −62 dBm. On the other hand, the DSC algorithm could potentially be unfair to the disadvantaged users (e.g. cell edge users). The inventors have recognised that optimizing CCA threshold level that maximizes throughput is a challenging problem.

Figure 2:
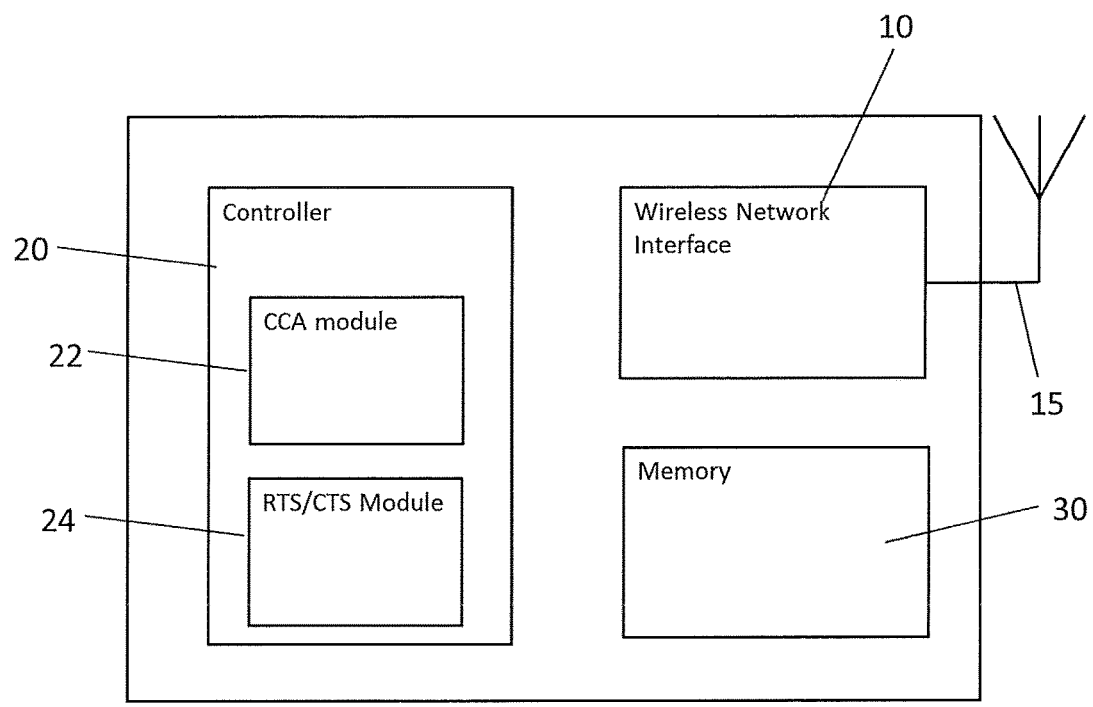
FIG. 2 shows distributed stations setting their CCA threshold.
Figure 3:
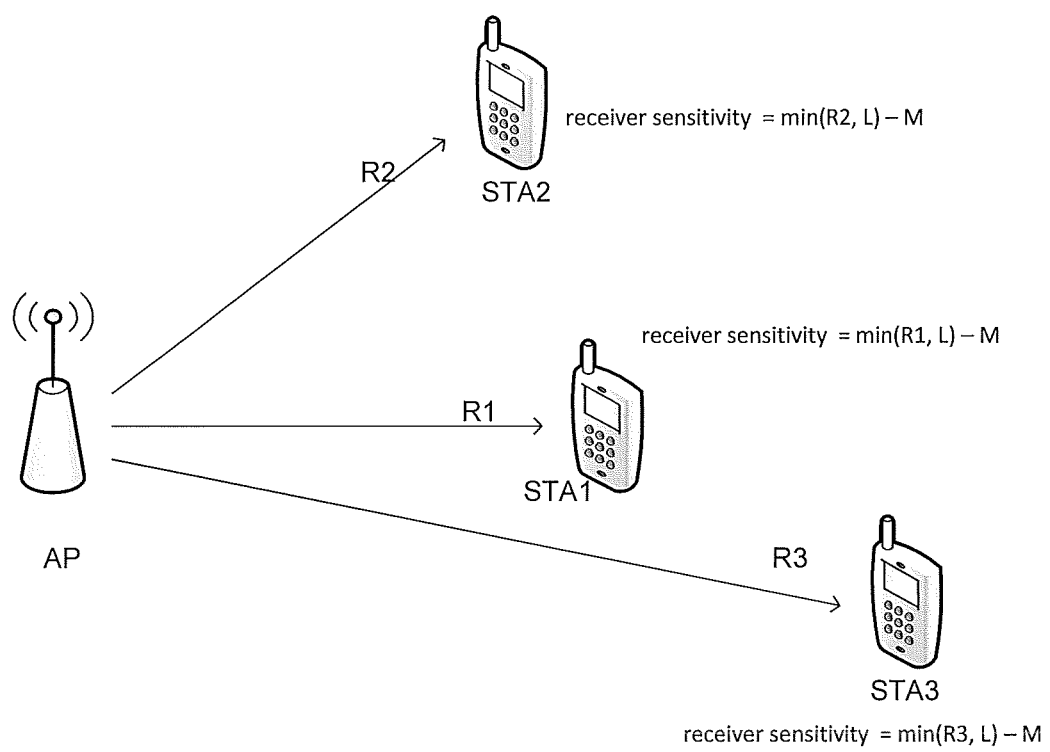
FIG. 3 shows an access point according to an embodiment.

Adaptive CCA algorithms could maximise per-STA throughput, overall AP (network) throughput, fairness among STAs, $5^{th}$ percentile (edge user) fairness and even spatial reuse. FIG. 2 shows a station in further detail. The station comprises a wireless network interface 10, a controller 20 comprising a clear channel assessment (CCA) module 22 and a request-to-send/clear-to-send (RTS/CTS) module 24 and a memory 30. The wireless network interface 10 is coupled to an antenna 15.

The wireless network interface 10 is operable to send and receive signals using the antenna 15 on one or more of a plurality of radio frequency channels defined in a radiofrequency spectrum. The controller 20 is configured to manage the wireless network interface 10 to send and receive signals according to a communication protocol, for example, to stations or access points as shown in FIG. 1. The controller is in communicative connection with the memory 30. The CCA module 22 determines when the channel is clear to reduce packet collisions at the access point as discussed in relation to FIG. 1. The RTS/CTS module 24 controls the exchange of RTS and CTS packets.

Figure 4:
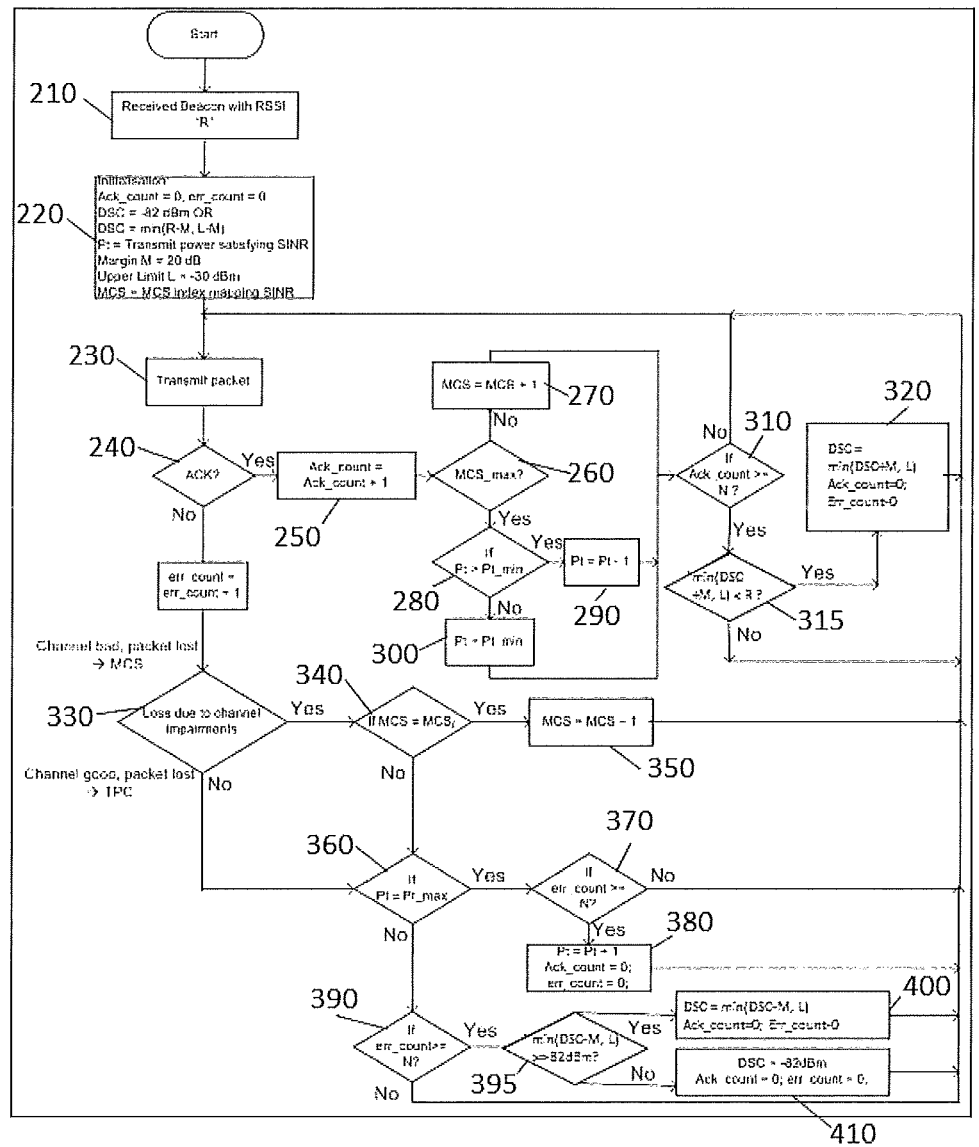
FIG. 4 shows an algorithm for setting CCA threshold and transmit power control.

FIG. 4 illustrates an algorithm according to an embodiment of the invention. The algorithm of the embodiment is executed in a distributed manner, i.e. as and when required the individual stations (STAs) adapt their CCA thresholds and transmit power such that the throughput is maximized.

The APs transmit beacons at regular intervals. All the STAs associated with the AP receives this beacon (step 210) if the link quality at the receiving STA is above a threshold. The STA estimates the link quality as received signal strength indicator (RSSI) as R in dBm. Techniques for estimating link quality are known in the art and are not described in any detail in the present disclosure for this reason.

Based on the R value, the STA sets, in step 220, the initial transmit power ($P_t$), MCS and initial DSC level (default −82 dBm or min(R−M, L)), where M is a Margin value. To cater for the cases when the STA is close to its AP there is also a value "L" above which the receiver sensitivity of the station is not permitted to rise. The initial receiver sensitivity can therefore be set to either −82 dBm or min(R−M, L). All the counters are also set to 0.

The transmit power may be set to a default value or, alternatively as indicated in step 220 of FIG. 4 to a power level that is sufficient to generate a signal to noise ratio of the signal received at the AP that matches or only exceeds the signal to noise ratio required for successful data exchange with the AP by only a small margin.

After initialisation the STA begins packet transmission (step 230). If the packet is successfully received by the AP, the STA can determine in step 240 that an acknowledgment (ACK) packet has been received and an acknowledgement counter Ack_count is incremented in step 250.

Table 1 shows a list of modulation and coding scheme parameters that may be employed for data transmission in the network/by the stations in the 802.11ac standard.

TABLE 1

| MCS index value | Modulation | Code Rate |
|---|---|---|
| 0 | BPSK | 1/2 |
| 1 | QPSK | 1/2 |
| 2 | QPSK | 3/4 |
| 3 | 16-QAM | 1/2 |
| 4 | 16-QAM | 3/4 |
| 5 | 64-QAM | 2/3 |
| 6 | 64-QAM | 3/4 |
| 7 | 64-QAM | 5/6 |
| 8 | 256-QAM | 3/4 |
| 9 | 256-QAM | 5/6 |

Table 2 shows the SNR required before the above MCS indexes listed in Table 1 can be used.

TABLE 2

| | MCS | | | | | | | | | |
|---|---|---|---|---|---|---|---|---|---|---|
| | 0 | 1 | 2 | 3 | 4 | 5 | 6 | 7 | 8 | 9 |
| SNR (dB) | 3.2 | 7 | 9.6 | 11.8 | 15.5 | 18.8 | 20.4 | 21.9 | 25 | 27 |

The MCS index values give combinations of number of spatial streams, modulation and code rate. As per 802.11-2012 standard, the MCS takes value between 0 and 76. Selecting MCS was made simpler in 802.11ac where the options are limited to 10. The higher the MCS index the less likely it becomes that errors in data transmission can be corrected. Higher MCS indexes therefore indicate lower redundancy modulation and coding schemes. In the embodiment the selection of a modulation and coding scheme may be based on the contents of Tables 1 and/or 2. Alternative table comprising more or fewer modulation and coding schemes can also be used. In one embodiment the relevant table or tables are stored in the memory of the station for ease of reference.

If a packet has been successfully transmitted, then there may be scope for using an encoding scheme that has less redundancy than the one used for making the successful transmission. Choosing such a 'less redundant' coding scheme allows increasing transmission bandwidth. Alternatively or additionally the power used for transmission can be reduced, to preserve station battery life and/or reduce the likelihood of packet collision/interference with other devices or even devices in different networks.

In the embodiment it is checked in step 260 whether or not the coding and modulation scheme with the highest available MCS index has been used for the last successful transmission. If this is not the case, then the MCS scheme with the next higher index is set up use in the next data transmission in step 270. Should the modulation and coding scheme with the highest index have already been used, then the transmit power is decreased in step 290 if in step 280 it is determined that the transmit power used for the most recent data transmission is above the minimum required transmit power, or retained at the minimum transmit power in step 300.

In the embodiment the decision to change the CCA threshold is calculated over N packets. If the counter of successful ACKs is found in step 310 to have reached N, the receiver sensitivity is decreased in step 320 to the lower one of the current receive sensitivity increased by the margin M and the maximum value L above which the receive sensitivity is not allowed to raise. The increase of step 320 is, however, only applied if the new receive sensitivity that would be applied does not exceed the access point's RSSI "R". This is verified in step 315. The acknowledgement counter (Ack_count) as well as a counter counting the number of erroneous attempts to transmit a data packet (err_count) are reset to zero in step 320. By decreasing the receiver sensitivity the opportunity for transmissions is increased, positively affecting per stations throughput. The acknowledgement counter has not yet reached the predetermined value N, the receiver sensitivity remains the same and the process returns to the transmission of the next data packet in step 230.

On the other hand, if the packet is dropped i.e. when no acknowledgment packet is received, the method moves on by increasing the error count (err_count) and proceeds to ascertain (in step 330) whether the packet has been dropped due to channel impairment. Frames sent over an 802.11 wireless link may be received (i) with a PHY error, where the PHY header is corrupted by noise/interference and the receiver cannot demodulate the frame, or (ii) with a CRC error, where the PHY header is received correctly and the frame is decoded but then fails a CRC check or (iii) without error. Methods of investigating whether or not a frame has been dropped due to channel impairment are well known in the art and do not need to be discussed in detail in the context of the present disclosure for this reason. Should this be the case and should it be determined in step 340 that the modulation and coding scheme used is not the one that offers the most redundancy (i.e. the one with index 0), then the index of the modulation and coding scheme is decremented by one in step 350. In adapting the possible transmission rate/redundancy by selecting a more robust modulation and coding scheme any challenge posed by fluctuations in interference can be addressed. It will be appreciated that stations affected by low SINR will gradually converge to lower MCS.

Should it be determined in step 330 that the frame loss is not a result of channel impairment or, even if it was and has been determined in step 340 that the modulation and coding scheme with the lowest index had been used in the last transmission, then the method proceeds to step 360, in which it is checked if the maximum available/permissible transmit power has been used for the last transmission. Should this be the case and should it be found in step 370 that the error count err_count exceeds a predetermined value N (which can be the same predetermined value as the value N used for the acknowledgement count but can, in a different embodiment, be a different value), then the transmit power is increased in step 380 and the Ack_count and err_count counters are set to zero. In one embodiment the transmit power values that can be used by a station are predetermined, so that, as indicated in step 380, merely the index of the allowable/predetermined transmit power values has to be incremented. Alternatively it is also envisaged that the transmit power is increased by a predetermined amount and the updated transmit power value is stored in memory for use in the next transmission.

If it is determined in step 360 that the maximum available/permissible transmit power Pt has been used in the last transmission attempt and if it is determined in step 390 that the transmission has failed more than the predetermined number of times N, then the receive sensitivity is set to a new value in either of steps 400 and 410. As shown in step 400, the receive value is set to the smaller value out of the current receive sensitivity reduced by the margin M and the maximum value L above which the receive sensitivity is not allowed to rise. If, however, it is determined in step 395 that the receive sensitivity calculated in this manner would be smaller than a default minimum value (in this case −82 dBm), then the receive sensitivity is set to the default value in step 410. Otherwise the new receive sensitivity is set to the value calculated in step 400.

If the error count has not yet reached the predetermined number N in either of steps 370 and 390, then the method proceeds to transmit the next frame in step 230.

In the algorithm of the embodiment, transmit power control is used to overcome the frame losses, or if the MCS has reached lowest index value and still doesn't lead to a successful transmission. The recent 802.11h-2003 standards provide transmit-power reporting mechanism that makes such intelligent TPC feasible at the MAC layer.

In the algorithm of the embodiment, transmit power is adapted when adapting MCS isn't possible any further (i.e. when current MCS has reached either the highest or lowest value). It will, however, be appreciated that it is not essential that MCS has to be altered until the highest or lowest value is reached before the transmit power can be altered. In alternative embodiments alternation of transit power can take place even if the highest or lowest MCS has not been reached.

In an embodiment, if after adapting, the transmit power reaches the maximum transmission power allowed, then the CCA level is reduced by margin M. In other embodiments the CCA level is adapted even if the transmit power has not reached its maximum level.

An increase in transmit power at the STA increases the SNR of the link (uplink) between STA and AP. Thus, the AP would be able to receive/decode the message better. Also, the increase in transmit power also increases the transmission and interference range of the STA.

In one embodiment the value of margin M is a fixed value. In another embodiment a value that changes with/is inversely proportional to the number of stations associated with the access point is used. If there are fewer stations, the steps with which the STAs vary the CCA level is larger in this embodiment to exploit spatial reuse. However, in a higher density network, a bigger margin M (say 20 dB) results in a bigger step change in receiver sensitivity. It is very unlikely that STAs would be able to change CCA threshold under such conditions without having high collisions as a result. With Margin M varying, for example in the steps of [1 dB, 2 dB, 5 dB, 10 dB and 20 dB] mapped to an inverse of the size of the network (number of nodes associated with the AP), a good control of CCA can be exercised.

Given that the stations acquire sufficient knowledge of its surroundings and environment they can act on their own without requiring coordination with other nodes in the network. Moreover, the transmit power control gives some additional mechanisms to the $5^{th}$ percentile (cell edge) users as well as legacy STAs to overcome the losses thereby offering opportunities for throughput improvement. Cell edge users in particular can increase their transmit power to improve data transmission whilst users located closer to the access point may reduce transmit power to conserve energy.

According to any and all embodiments explained above a fairer and more efficient wireless network can be achieved. While certain embodiments have been described, these embodiments have been presented by way of example only, and are not intended to limit the scope of the inventions. Indeed, the novel methods and devices described herein may be embodied in a variety of other forms; furthermore, various omissions, substitutions and changes in the form of the methods and devices described herein may be made without departing from the spirit of the inventions. The accompanying claims and their equivalents are intended to cover such forms or modifications as would fall within the scope and spirit of the inventions.

The invention claimed is:

1. A device configured to be capable of dynamically adjusting a CCA threshold in an addressable unit that is suitable for communication in a wireless network, the device comprising a part operative to increase the CCA threshold in view of successful data transmissions and/or decreasing the CCA threshold in view of unsuccessful data transmissions;
   wherein the device is further operative to increase transmit power following one or more unsuccessful data transmissions and/or decrease transmit power following one or more successful data transmissions, and
   wherein the device is further operative to at least one of:
   a) decrease said CCA threshold following an unsuccessful data transmission only if, following a preceding unsuccessful data transmission, the transmit power had been increased, and
   b) increase said CCA threshold following a successful data transmission only if, following a preceding successful data transmission, the transmit power had been decreased.

2. A device according to claim 1, further operative to decrease said CCA threshold if, after the transmit power has been maximised, data transmission is still unsuccessful.

3. A device according to claim 1, further operative to increase or decrease said CCA threshold following a predetermined number of respective successful or unsuccessful data transmissions.

4. A device according to claim 1, further operative to check, following a determination that a data transmission was unsuccessful, whether the data transmission was unsuccessful as a result of channel impairment and, if the data transmission was unsuccessful as a result of channel impairment, select a modulation and coding scheme that accommodates a less reliable channel than the protocol used for the failed data transmission.

5. A device according to claim 1, wherein an amount by which the CCA value is increased or decreased is inversely proportional to a number of further addressable units known by the addressable units as being present in the network.

6. A device according to claim 1, wherein an amount by which the CCA value is increased or decreased is selected from a list of possible amounts stored in or available to the addressable unit.

7. A method of dynamically adjusting a CCA threshold in an addressable unit that is suitable for communication in a wireless network, the method performed in the addressable unit and comprising:
- autonomously increasing the CCA threshold with successful data transmissions and/or autonomously decreasing the CCA threshold with unsuccessful data transmissions; and
- increasing transmit power following one or more unsuccessful data transmissions and/or decreasing transmit power following one or more successful data transmissions,
- wherein at least one of:
  - a) said CCA threshold is decreased following an unsuccessful data transmission only if, following a preceding unsuccessful data transmission, the transmit power had been increased, and
  - b) said CCA threshold is increased following a successful data transmission only if, following a preceding successful data transmission, the transmit power had been decreased.

8. A method according to claim 7, wherein said CCA threshold is decreased if, after the transmit power has been maximised, data transmission is still unsuccessful.

9. A method according to claim 7, wherein said CCA threshold is increased or decreased following a predetermined number of respective successful or unsuccessful data transmissions.

10. A method according to claim 7, further comprising checking, following a determination that a data transmission was unsuccessful, whether the data transmission was unsuccessful as a result of channel impairment and, if the data transmission was unsuccessful as a result of channel impairment, selecting a modulation and coding scheme that accommodates a less reliable channel than the protocol used for the failed data transmission.

11. A method according to claim 7, wherein an amount by which the CCA value is increased or decreased is inversely proportional to a number of further addressable units known by the addressable units as being present in the network.

12. A method according to claim 7, wherein an amount by which the CCA value is increased or decreased is selected from a list of possible amounts stored in or available to the addressable unit.

* * * * *